Dec. 4, 1951  J. W. WHITE, JR  2,577,554
AUTOMATIC FISHING REEL
Filed Dec. 28, 1948
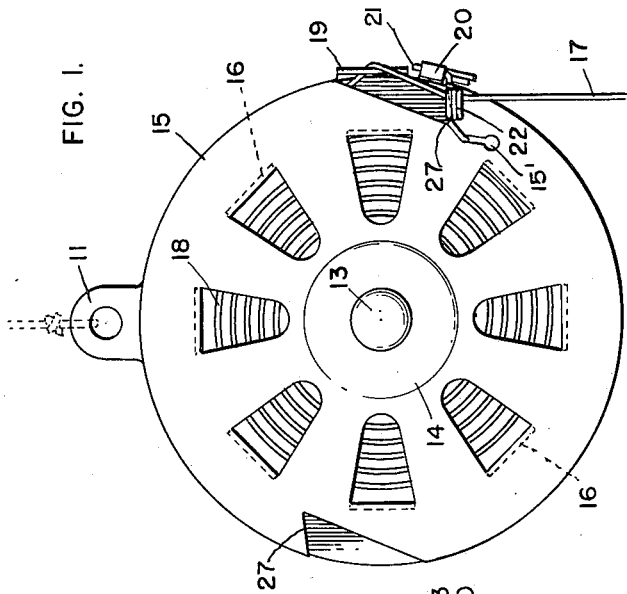
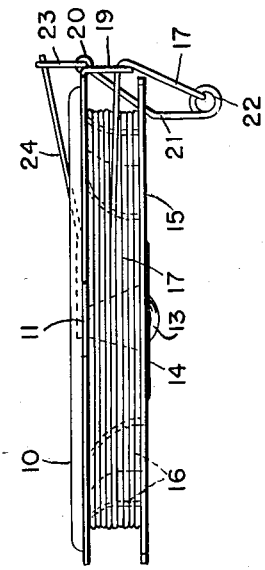
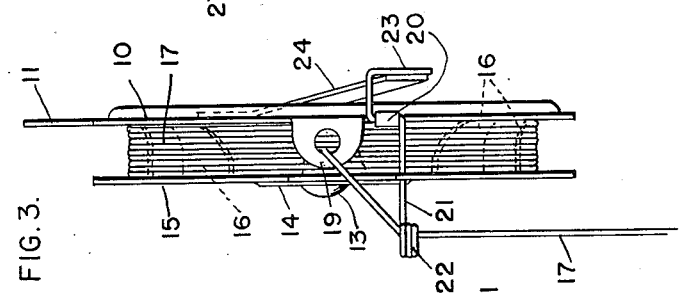
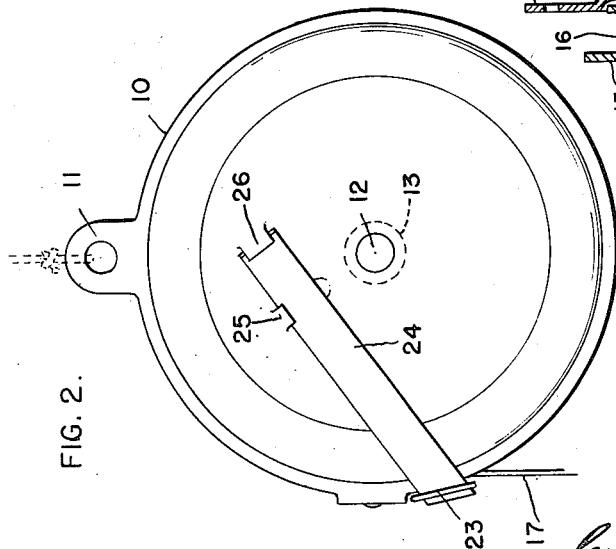
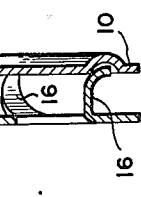
Inventor
JOHN W. WHITE, JR.
Cushman, Darby & Cushman
Attorneys Patented Dec. 4, 1951

2,577,554

UNITED STATES PATENT OFFICE 2,577,554

AUTOMATIC FISHING REEL

John W. White, Jr., Little Rock, Ark.

Application December 28, 1948, Serial No. 67,626

4 Claims. (Cl. 242—109)

This invention relates to fishing reels of the automatic type in which provision is made for the automatic reeling in of the fish when a strike is made, mechanism being provided for releasing a reel spring when pull is exerted on the hook to reel in the catch.

In my application Serial No. 40,925, I have shown a reel of this general type in which automatic reeling in action is provided for, and further, the reel is equipped with means for normally maintaining the reel under spring tension, a line-engageable trigger being provided for releasing the spring actuated reel. The construction shown in the application referred to is a satisfactory one, but the present invention has features which differentiate from the earlier construction and contribute to ease of manufacture, assembling of the parts, and operation of the reel.

In the drawings herewith, forming part of this disclosure, is shown one embodiment of the invention for illustrative purposes, but this illustration is not to be regarded as limiting the invention to the specific construction shown.

In said drawings:

Figure 1 is a view in elevation of one side of the reel.

Figure 2 is a view in elevation of the opposite side of the reel.

Figure 3 is an edge view of the reel viewed from the right of Fig. 1.

Figure 4 is an edge viewed from the top of Fig. 1.

Figure 5 is a view in cross section showing the mounting of the fixed and rotatable front and back plates and the line supporting lugs.

The elements shown in the drawings, which form part of this disclosure, are designated by numbers, the same numbers being applied to the same parts in the several views.

The reel housing is made up of a fixed plate 10 provided with hanger 11 by which the reel may be suspended from any suitable support. Fixed plate 10 has a central shaft 12 provided with a head 13 and a washer 14, on which shaft is mounted a rotatable line-carrying plate 15. Line-supporting lugs 16, shown in dotted lines, may be struck from plate 15 to hold the reeled line 17 in proper position. The knotted end of the line 17 is held in the inverted key hole opening 15', as shown in Figure 1. A coiled spring 18 is provided inside of the reel with its inner end secured to shaft 12 in any suitable manner and its outer end secured to the rotatable plate 15. Spring 18 is tensioned so as to tend always to rotate the plate 15 to reel in the line when the plate 15 is released, in the usual manner of coiled and tensioned springs.

The housing is open at its periphery to provide an open reel on which the line may be wound and unwound without interference, the construction providing a very simple and efficient housing.

Extending inwardly over the coiled line is a line guide 19 having an opening through which the line runs and is guided to and from the reel. Mounted on a suitable bearing type support 20 carried by the fixed plate 10 is a trigger 21 having a line-receiving coil 22 projecting outwardly beyond the line-carrying plate 15 and an arm 23 which projects outwardly and downwardly beyond the fixed plate. This trigger construction provides sufficient leverage to ensure easy and prompt actuation of the trigger, under line pull, for release and resetting of the reel. Mounted on the fixed plate is a flat spring strip 24 detachably supported by clips 25 and 26 preferably struck up from the material of the back plate in which the arm 24 is detachably mounted. The outer free end of the spring 24 engages the arm 23 on the trigger 21 and tends to maintain it always in position to engage stops on the rotatable plate 15. The stops, as here shown, are in the form of notches 27 which engage the trigger 21, under the action of spring 24, and normally hold the rotatable plate against movement under the action of the rotating spring 18. Pull of the line 17 on loop 22 of the trigger 21 will at once trip the trigger 21 out of a notch 27 and the coil spring 18 will then be free to rotate the plate 15, exerting reeling in pull on the line 17. The trigger 21 will be actuated when the hook is struck and the reel released, so that the spring 18 will immediately begin to reel in the line and the catch. On any cessation of pull on the line, spring 24 will return trigger 21 to re-engage a notch 27 and prevent further reeling in. The spring 24, in the form shown, can be removed and adjusted as to tension by bending it more or less to increase or decrease its spring action and this is a distinctly valuable feature as the strength of the spring 24 and its action on the trigger 21 can be adjusted to meet the needs of the particular fishing operation.

While a particular construction has been shown, it will be understood that mechanical variations may be made without departing from the invention as defined in the appended claims and such changes as merely involve mechanical skill are to be regarded as within the range of the invention.

I claim:

1. A fishing reel comprising a peripherally open housing having a stationary back plate, a front plate journalled to and rotatable relative to said stationary back plate, line supporting lugs mounted on said front plate, a plurality of peripheral stops on said rotatable plate, a line guide on said fixed plate, a line actuated trigger pivotally mounted on said fixed plate and extending laterally across the outer periphery of said rotatable plate to engage the peripheral stops on said rotatable plate, and a flat spring mounted on said fixed plate to engage and hold said trigger normally in stop-engaging position.

2. The invention as defined in claim 1 in which the flat trigger holding spring is positioned transversely of the fixed plate.

3. A fishing reel comprising a peripherally open housing having a fixed plate, line supporting lugs mounted on a plate coupled to and rotatable relative to said fixed plate, a plurality of peripheral stops on said rotatable plate, a line guide on said fixed plate, a line actuated trigger pivotally mounted on said fixed plate and extending laterally across the outer periphery of said rotatable plate to engage the peripheral stops on said rotatable plate, a line engaging loop at one end of said trigger, a spring engageable arm at the other end of said trigger, and a flat trigger holding spring mounted on said fixed plate to engage and hold said trigger normally in stop-engaging position.

4. A fishing reel comprising a peripherally open housing having a stationary back plate, a front plate journalled to and rotatable relative to said stationary back plate, line supporting lugs mounted on said front plate, a plurality of peripheral stops on said rotatable plate, a line guide on said fixed plate, a trigger pivotally mounted on said fixed plate and extending laterally across the outer periphery of said rotatable plate and outwardly beyond the line carrying plate, a spring engageable arm at the other end of said trigger extending outwardly and downwardly beyond said fixed plate, and a flat trigger actuating spring mounted on said fixed plate to engage said arm and hold said trigger normally in engagement with said stops.

JOHN W. WHITE, Jr.

REFERENCES CITED

The following references are of record in the file of this patent:

UNITED STATES PATENTS

| Number | Name | Date |
|---|---|---|
| 384,853 | Keller | June 19, 1888 |
| 887,689 | Olop | May 12, 1908 |
| 1,524,011 | Ballew | Jan. 27, 1925 |
| 2,194,088 | Joabson | Mar. 19, 1940 |
| 2,303,668 | Tilbury | Dec. 1, 1942 |

FOREIGN PATENTS

| Number | Country | Date |
|---|---|---|
| 388,595 | France | Aug. 17, 1908 |